United States Patent
Hildenbrand et al.

(10) Patent No.: US 6,320,021 B1
(45) Date of Patent: Nov. 20, 2001

(54) CONTINUOUS POLYAMIDE EXTRACTION PROCESS

(75) Inventors: Peter Hildenbrand, Karlsruhe; Reinhard Lang, Neustadt; Alfons Ludwig, Höxter; Gunter Pipper, Bad Dürkheim, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/554,217

(22) PCT Filed: Nov. 24, 1998

(86) PCT No.: PCT/EP98/07576

§ 371 Date: May 11, 2000

§ 102(e) Date: May 11, 2000

(87) PCT Pub. No.: WO99/26998

PCT Pub. Date: Jun. 3, 1999

(30) Foreign Application Priority Data

Nov. 25, 1997 (DE) ................................ 197 52 182

(51) Int. Cl.⁷ ............................. C08G 69/16; C08G 69/46
(52) U.S. Cl. .................... 528/499; 528/310; 528/323; 528/480; 528/491
(58) Field of Search ............... 528/491, 480, 528/499, 310, 323

(56) References Cited

U.S. PATENT DOCUMENTS

| 3,245,964 | * | 4/1966 | Wiesner et al. | 528/499 |
|---|---|---|---|---|
| 3,374,207 | * | 3/1968 | Ryffel et al. | 528/499 |
| 3,423,183 | | 1/1969 | Goetzke | 23/270 |
| 3,639,659 | | 2/1972 | Nieswandt et al. | 260/78 |
| 3,905,946 | * | 9/1975 | Nieswandt et al. | 528/499 |
| 4,002,430 | * | 1/1977 | Hoerauf et al. | 528/499 |
| 4,051,113 | * | 9/1977 | Kissel et al. | 528/499 |
| 4,053,457 | | 10/1977 | Cordes et al. | 260/78 |
| 4,376,680 | | 3/1983 | Horak et al. | 203/89 |
| 4,816,557 | | 3/1989 | Pipper et al. | 528/500 |
| 4,978,743 | * | 12/1990 | Selbeck et al. | 528/499 |

FOREIGN PATENT DOCUMENTS

| 27 32 328 | 1/1979 | (DE) . |
|---|---|---|
| 206 999 | 2/1984 | (DE) . |
| 289 471 | 5/1991 | (DE) . |
| 43 24 616 | 1/1995 | (DE) . |
| 19505150 | 8/1996 | (DE) . |
| 1 297 606 | 11/1972 | (GB) . |
| 45025519 | 8/1970 | (JP) . |
| 4726438 | 10/1972 | (JP) . |
| 48002233 | 1/1973 | (JP) . |
| 51149397 | 12/1976 | (JP) . |
| 53071196 | 6/1978 | (JP) . |
| 60166324 | 8/1985 | (JP) . |

* cited by examiner

*Primary Examiner*—P. Hampton-Hightower
(74) *Attorney, Agent, or Firm*—Keil & Weinkauf

(57) ABSTRACT

A process for continuous extraction of polyamide particles in an essentially vertical extraction column using an aqueous extractant comprises using an extraction column that is divided into two zones and performing an extraction with a recirculating 15–40% strength by weight aqueous ε-caprolactam solution in the first zone and then with countercurrent water at a from 5 to 40° C. lower temperature in the second zone. The process provides for economical extraction of polyamides with a low level of monomers and oligomers.

11 Claims, 1 Drawing Sheet

CONTINUOUS POLYAMIDE EXTRACTION PROCESS

FIELD OF THE INVENTION

Figure 1:
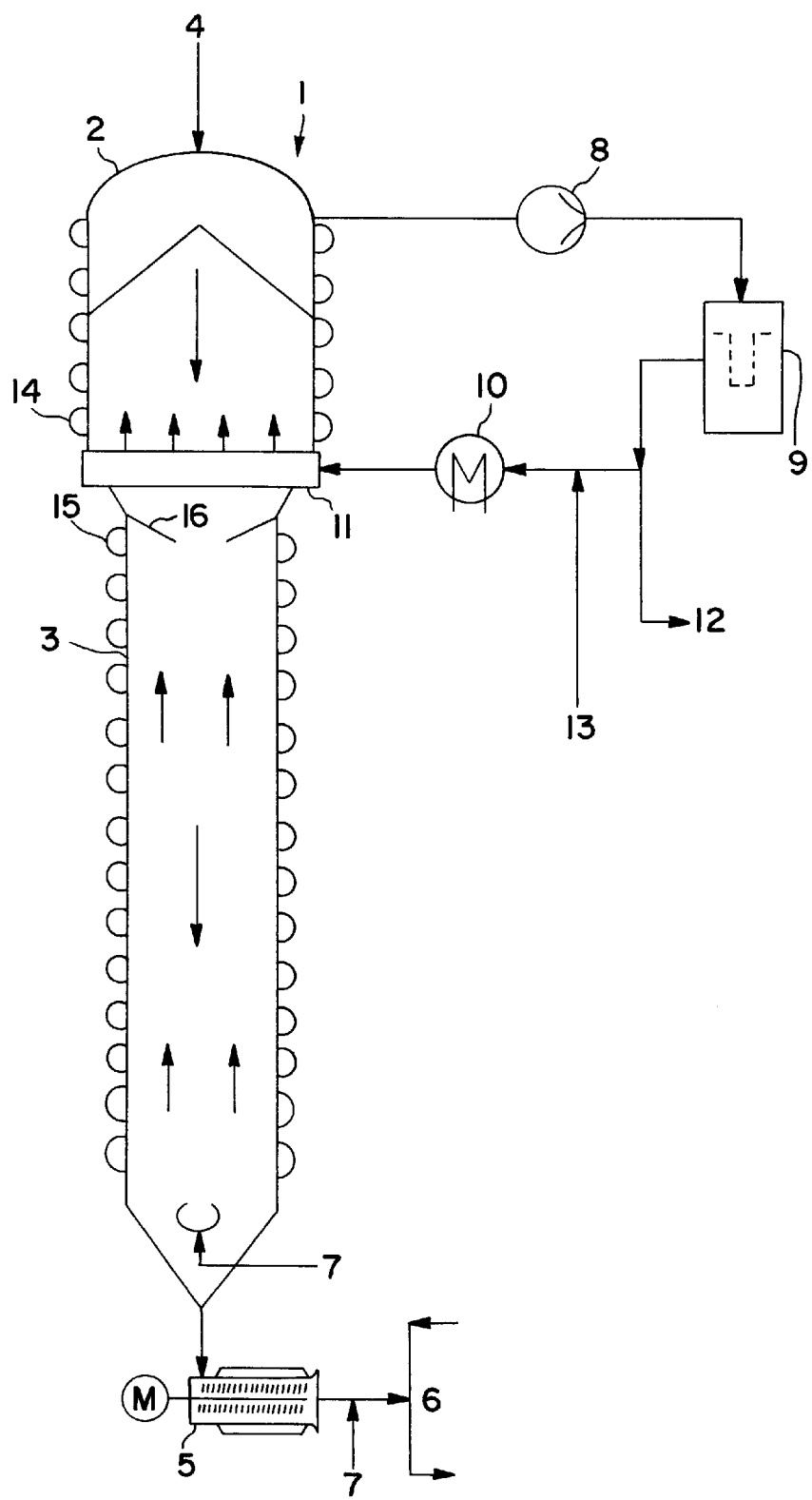

The present invention relates to a process for continuous countercurrent extraction of polyamide in a vertical two-part extraction column by treating polyamide particles with recirculating aqueous ε-caprolactam solution.

PRIOR ART

Nylon 6 (polycaprolactam) is produced by polymerization of ε-caprolactam. The polycaprolactam obtained has a caprolactam monomer and oligomer content of, for example, from 8 to 11% by, weight. Left in the polycaprolactam product, these low molecular weight constituents cause undesirable effects in further processing of the polymer product and must therefore be removed. Industrially, this is accomplished by continuous or batchwise extraction with hot water (DE-A-25 01 348, DE-A-27 32 328) and by distillative removal under reduced pressure (U.S. Pat. No. 4,376,680) or in superheated steam (EP 0 284 968 B1). These processes are all carried out with an eye to recovering and reusing the extractables for reasons of environmental protection and economy. For nylon 6, these processes leave residual extractables (methanol-extractables) consisting essentially of caprolactam oligomers which are sparingly soluble in water or involatile, especially dimers and cyclic oligomers.

Various apparatus has been proposed for extracting low molecular constituents from polyamides. GB 12 97 606 discloses an extraction column that is divided into at least two zones, the extractant being recirculated within each zone in countercurrent to the flow of liquid by removal at the upper end of the zone and reintroduction at the lower end of the zone. Similar apparatus is described, for example, in CZ 253 019, FR 15 18 775, DD 206 999 and DE-A-17 70 097.

It is known that caprolactam monomer acts as a solublizer for caprolactam oligomer in the extraction of nylon 6. This is why, for example according to JP-A-47 026438, the nylon 6 chips are pretreated with a solution of from 15 to 90%, preferably of from 40 to 70%, of c-caprolactam to remove the water-solubles. In DD 289 471, the chips are initially treated in countercurrent at above 60° C. with from 1 to 40% of caprolactam in the wash water (the percentages are each by weight). DE-A-43 24 616 discloses a process for extracting nylon 6 to obtain products having a very low residual level of dimeric ε-caprolactam. Here, a first stage, which features an extraction with from 41 to 80% caprolactam solution at from 80 to 120° C., is followed by one or more postextraction stages, either with water at high temperature or under reduced pressure. In JP-A-48 002 233 polycaprolactam is purified by admixing the molten polymer with from 5 to 30% strength caprolactam solution and then purifying the resulting dispersion at from 80 to 120° C. in an extraction column. In JP-A-53 071 196, polyamide is initially extracted with a hot aqueous medium and then purified at from 10 to 50° C. below the melting point of the polyamide in an inert gas stream, the hot aqueous medium comprising, for example, water at from 80 to 130° C. with an ε-caprolactam content of less than 50% by weight. JP A-45 025 519 discloses a multistage extraction process wherein the polyamide chips are extracted with from 5 to 50% strength aqueous caprolactam solution at from 70 to 120° C. in the first stage and with from 0.1 to 5% strength aqueous caprolactam solution at from 70 to 120° C. in the second stage. JP-A-51 149 397 describes an extraction with an aqueous 60% strength by weight ε-caprolactam solution at from 80 to 120° C. for from 3 to 8 hours in the first stage and an extraction with caprolactam-free water, which is preferably $O_2$-free or comprises small amounts of a reducing agent, in the last stage. These processes too are preferably carried out with recovery and reuse of the extractables for reasons of environmental protection and economy. Accordingly, JP-A-60 166 324 discloses a continuous nylon 6 extractor wherein the chips are extracted with water in countercurrent by recirculating the bulk of the extraction liquid with addition of ε-caprolactam. The extractant is pumped off through an aspirator, admixed with caprolactam and returned into the apparatus via a distributor located at the same level as the aspirator. The residual extractables content is 1%.

In DE-A-195 05 150 the caprolactam oligomer is removed from polyamide chips by treatment with pure caprolactam as extractant at from 60 to 150° C. However, this method has the disadvantage that adherent caprolactam may lead to stickiness of the chips in subsequent operations. Moreover, at these temperatures, the chips would also dissolve in caprolactam to some extent.

Using water or water vapor as extractant for the polyamide chips it is very difficult to achieve the present-day requirement of residual extractables contents <0.5%. The extract obtained will typically be a solution having an extractables content of from 5 to 15%, similar to what is obtained using caprolactam-comprising extractants. The extract may additionally include inorganics such as titanium dioxide, silicon dioxide and manganese oxide, typically added to the polyamide for stabilization or delustering. Existing processes have in common that either the residual extractables content of the chips is too high or that the aqueous extract has to be highly concentrated in order that the caprolactam monomer and caprolactam oligomer may be recycled into the polymerization. Oligomer and inorganics may separate out during the concentrating, which also has appreciable energy requirements.

SUMMARY OF THE INVENTION

It is an object of the present invention to provide a process for purifying polyamide to a very low residual level of monomers and oligomers without generating large volumes of extractant having a low extractables content.

We have found that, surprisingly, this object is achieved according to the invention by a process for continuous extraction of polyamide particles, especially polyamide chips or flakes, in an essentially vertical extraction column using an aqueous extractant, which comprises using an extraction column that is divided into two zones and performing an extraction in the first zone with a recirculating 15–40% strength by weight aqueous ε-caprolactam solution and then in the second zone with water in countercurrent.

The process has the advantage that the level of caprolactam oligomer in the polyamide chips is reduced in a simple manner to obtain an extract which requires distinctly less workup before being feedable into the polymerization reactor. In addition, the required low residual extractables content of <0.5%, especially <0.1% of dimer, is achieved in an economical and simple manner in a single extraction apparatus. The extraction, moreover, provides the desired low level of oligomer appreciably faster than is the case in existing processes.

DETAILED DESCRIPTION

Suitable polyamides are polycaprolactam or copolyamides of caprolactam and further polyamide-forming starting materials, the caprolactam-derived portion being preferably not less than 20% by weight, especially not less than 25% by weight. Preferred polyamide-forming starting materials are diamines and dicarboxylic acids suitable for forming polyamides. Suitable dicarboxylic acids are, for example, alkanedicarboxylic acid having from 6 to 12 carbon atoms, especially from 6 to 10 carbon atoms, and also terephthalic acid and isophthalic acid. Suitable diamines are, for example, alkanediamines having from 4 to 12, especially from 6 to 8, carbon atoms, also m-xylylenediamine, bis(4-aminophenyl)methane, 2,2-bis(4-aminophenyl)propane or bis(4-aminocyclohexyl)methane. Dicarboxylic acids and diamines can each be used in any desired combinations, but advantageously in an equivalent ratio. Of particular industrial significance are polycaprolactam and polyamides based on caprolactam, hexamethylenediamine and also adipic acid, isophthalic acid and/or terephthalic acid.

Polyamide chips typically comprise from 2 to 15% by weight of caprolactam monomer and caprolactam oligomer, especially from 8 to 12% by weight of caprolactam monomer and caprolactam oligomer. Polyamide chips generally have a size within the range from 1.5×1.5 mm to 4×4 mm, for example have a cylindrical shape measuring about 3×2 mm.

The polyamides used may additionally include customary additives such as delusterants, e.g. titanium dioxide, nucleating agents, e.g., magnesium silicate, stabilizers, e.g., copper(I) halides and alkali metal halides, antioxidants and reinforcing agents in customary amounts. The additives are typically added before, during or after the polymerization and before the pelletizing step.

The polyamide chips obtained after the polymerization and subsequent pelletization are fed to the two-part, preferably tubular, extraction column via a transportation water circuit, for example. The chips can be separated from the transporting water by a separating means, for example, and are then, customarily at a temperature of from 20 to 90° C., introduced at the top of the extraction column, i.e., into the extractor head. The chips pass downwardly through the extraction column under gravity and are discharged at the base of the extraction column. Water is continuously fed in at the base of the extraction column as an extractant which passes upwardly through the extraction column in countercurrent to the chips.

The extractant absorbs caprolactam monomer and oligomer in the bottom region of the extraction column, the second zone. The extractant is recirculated in the top part of the extraction column (extractor head). This extractor head, the first zone, accounts for 5 to 50%, preferably 15 to 30%, of the total volume of the extractor. The extractant is preferably withdrawn at the top of the first zone and reintroduced into the extraction column in the bottom region of the first zone by a distributing means at a uniform rate. However, it is also possible to proceed conversely, i.e., the extractant is withdrawn in the bottom region and reintroduced in the top region. The amount of extractant recirculating within the head is chosen so that, on the one hand, a temperature and concentration equilibration is ensured within this zone and an intensive mass transfer takes place at the phase interface of the polyamide particles. On the other hand, the flow rate of the aqueous solution should not exceed the swirling point of the particles. Accordingly, the velocity is generally set within the range from about 2 to 20 m/h, preferably within the range from 3 to 15 m/h. In addition, the extractor head has a larger diameter than the second zone to additionally counteract any swirling up of the particles. The ratio of the cross-sectional area in the first zone to that in the second zone is within the range from about 1:1 to 3:1, especially within the range from 1:1 to 2:1. The ratio of the length of the first zone to that of the second zone is generally within the range from 0.05:1 to 1:1, preferably within the range from 0.1:1 to 0.3:1. The temperature in the extractor head is within the range from 100 to 140° C., preferably within the range from 115 to 130° C., and is set by a heat exchanger disposed within the head circuit of the extractant, outside the extraction column. Liquid caprolactam at from 80 to 100° C. is added to the head circuit to set a caprolactam concentration of from 15 to 40%, preferably of from 20 to 40%, especially of from 20 to 30%, within the extractor head. This provides for faster and, owing to the better equilibrium position, more thorough removal of caprolactam oligomer, especially caprolactam dimer, from the polyamide. The extractant is continuously removed from the head circuit at the rate of the water feed at the base of the extractor and the caprolactam feed into the first zone.

The transition from the first zone to the second zone of the extraction column is preferably equipped with a flow barrier which, for example, by narrowing the flow cross-section, prevents any sinking of the aqueous solution, which has a higher specific gravity, from the extractor head into the second zone underneath. For example, a honeycomb-shaped constriction can be used to raise the superficial velocity of the ascending liquid phase. The narrowing of the flow cross-section underneath the extractor head additionally provides a very effective means for separating the region of the first zone which is characterized by pronounced backmixing from the second zone, in which a countercurrent concentration profile with little if any backmixing is desired. Sinking of the heavier extractant from the extractor head is further prevented by reducing the temperature in the second zone by from 5 to 40° C., preferably by from 10 to 20° C., as compared to the temperature in the first zone. In addition, the extractant flow velocity in the second zone is made relatively high by constructing this second, for example tubular, zone with a very small diameter. The superficial flow velocity is customarily within the range from 0.2 to 6.0 m/h, preferably within the range from 1 to 3 m/h. The tube cross-section can be comparatively small owing to the comparatively short total residence time of from 5 to 20 hours, especially of from 8 to 15 hours, required for adequate extraction. Furthermore, the resulting smaller extractor volume results in a relatively low, economical equipment height.

The extraction in the first zone and in the second zone is generally carried out at a temperature within the range from 80 to 140° C. The temperature in the second zone is preferably lowered by from 5 to 40° C., as mentioned. However, the temperature in the second zone can also be higher than that in the first zone, especially if the aforementioned narrowing of the flow cross-section and a high flow velocity for the extractant in the second zone are provided.

The addition of caprolactam during the extraction serves to stabilize the wash water obtained, so that oligomer concentrations of up to 6% are possible in the removed extractant without troublesome precipitations occurring in the subsequent process. The ratio of extractant to polyamide is within the range from 0.5:1 to 2:1 in the process of the invention. Compared with the prior extraction art without addition of caprolactam, accordingly, the process of the present invention requires a smaller water polyamide ratio owing to the better equilibrium position and the faster extraction. This reduces the amount of water to be evaporated when recovering the wash water, which improves the economics of the overall process.

The polyamide is preferably discharged from the reactor and continuously metered into a transportation water circuit by a screw, especially a deep-drawn single screw. The discharged amount of polyamide and hence the polyamide level in the extraction column can be controlled via the speed of the screw. The discharge screw provides for a very uniform and attritionless discharge of the polyamide and prevents bridging of particles. Since, moreover, this form of discharge is leakage-free, the countercurrent concentration profile in the extractor is not disturbed. The addition of small quantities of water in the transportation water circuit, which enter the extractor through the screw, serves to create, in the screw, a flow of liquid which is countercurrent to the exiting polyamide and at the same time ensures an upward flow of liquid phase in the base region of the extractor, preventing any backmixing.

The polyamide treated according to the invention has a residual extractables content of less than 0.5% by weight, especially less than 0.3% by weight, and a particularly low caprolactam dimer content of less than 0.1% by weight, especially less than 0.01% 5 by weight.

THE DRAWING

The FIGURE schematically depicts by way of example an extraction column for the process of the present invention. Said extraction column 1 comprises a first (upper) zone 2 and a second (lower) tubular zone 3. The ratio of the length of said first zone 2 to that of said second zone 3 is generally within the range from 0.05:1 to 1:1, preferably within the range from 0.1:1 to 0.3:1. The polyamide chips 4 are introduced into said first zone 2 from the top, pass through it downwardly and then through said tubular second zone 3 and are then discharged via the discharge screw 5 into the transportation water circuit 6. Water 7 is fed upwardly into the extraction column 1 through the discharge screw 5 and via an annular nozzle at the base of the extractor. On passing through said extraction column 1, the water initially picks up caprolactam in said second zone 3 and then mixes in the bottom part of said first zone 2 with the extractant which is circulated therein. This is removed in the top part of said first zone 2 by a pump 8, filtered in the filter 9, passed through a heat exchanger 10, which maintains the temperature within the desired range and reintroduced through an annular nozzle or perforated plate 11 in the bottom region of said first zone 2. Some of the extractant is removed at 12 and sufficient fresh caprolactam is supplied via 13 that the caprolactam concentration in the extractant is maintained within the desired range. The first and the second zones are heated via jacket heating tubes 14 and 15, respectively. Between the first and the second zone there is located a narrowing of the flow cross-section 16, which, together with the higher temperature in said first zone 2 compared with said second zone 3, prevents any sinking of the heavier caprolactam solution.

EXAMPLES

The Examples which follow illustrate the process of the present invention. The unextracted nylon 6 chips used are from 12.5 to 14.5 mg in weight on average and have a cylindrical shape measuring about 3×2 mm. They have a caprolactam monomer content of 9.0% and a dimer content of 0.63%.

Inventive Example 1

An extraction column 1 as per the Figure has a first zone 2 4500 mm in length and 147 mm in diameter and a second zone 3 23000 mm in length and 113 mm in diameter. 20 kg/h of unextracted nylon 6 chips 4 are introduced continuously into said first zone 2. 20 kg/h of fresh water 7 at 104° C. are continuously introduced into the base of extractor 1. In said first zone 2 0.2 m$^3$/h of wash water are removed using a recirculating pump 8 and, after passage through a filter means 9 and a heat exchanger 10, reintroduced into said extractor 1 via an annular nozzle or perforated plate 11, situated 4400 mm below the water surface. The temperature in said first zone 2 is set at 121° C. via said heat exchanger 10. 3.3 kg/h of liquid caprolactam 13 are metered into is the extractant circuit upstream of the heat exchanger to maintain a caprolactam concentration of about 20% in said first zone 2. Underneath the extractor head there is situated a flow barrier 16 in the form of a honeycomb-shaped constriction having a free diameter of 40 mm. This narrowing of the flow cross-section raises the superficial flow velocity of the ascending water phase to 15.9 m/h in this region. The nylon 6 chips discharged from said extractor 1 through extraction screw 5 have a residual extractables content of 0.3% and a dimer content of 0.02%.

Comparative Example 1

Nylon 6 chips are treated in the same way as in Inventive Example 1, except that no caprolactam is added in the extractor head, affording under otherwise identical conditions a nylon 6 chip product having a residual extractables content of 1.1% and a dimer content of 0.12%.

Inventive Example 2

Inventive Example 1 is repeated, except that 16 kg/h, instead of 20 kg/h, of fresh water are fed in at the base of the extractor at 104° C. and 2.3 kg/h instead of 3.3 kg/h of liquid caprolactam are metered into the header circuit. This corresponds to a water/chips ratio of 0.8. The nylon 6 chips obtained have a residual extractables content of 0.4% and a dimer content of 0.05%.

Comparative Example 2

Inventive Example 2 is repeated, except that the extraction is carried out with water without addition of caprolactam in the extractor head. The discharged nylon 6 chips have a residual extractables content of 1.4% and a dimer content of 0.15%.

Inventive Example 3

Unextracted nylon 6 chips having an average chip weight of 6.5 mg and a cylindrical shape are used under the same conditions as in Inventive Example 1. The discharged nylon 6 chips have a residual extractables content of 0.15% and a dimer content of less than 0.008%.

If desired, the polyamide can be further purified by known processes, for example in a simultaneous extraction and tempering as described in EP 0 284 968.

We claim:

1. A process for continuous extraction of polyamide particles in an essentially vertical extraction column using an aqueous extractant, which comprises using an extraction column that is divided into two zones and performing an extraction with a recirculating 15–40% strength by weight aqueous ε-caprolactam solution in the first zone and then with countercurrent water in the second zone, wherein the first zone of the extraction column has a larger diameter than the second zone and wherein the transition from the first zone to the second zone is equipped with a flow barrier.

2. A process as claimed in claim 1, wherein the extractant is recirculated by removing it in the top region of the first zone and feeding it into the bottom region of the first zone.

3. A process as claimed in claim 1, wherein the recirculated extractant is returned into the extraction column via an annular nozzle or perforated plate.

4. A process as claimed in claim 1, wherein a sufficient amount of the recirculating extractant is removed outside the extraction column and replaced with fresh caprolactam to establish a caprolactam content of from 15 to 40% by weight in the first zone together with the water introduced into the second zone.

5. A process as claimed in claim 1, wherein the ratio of the cross-sectional area of the first zone of the extraction column to that of the second zone is within the range of up to 3:1.

6. A process as claimed in claim 1, wherein the ratio of the length of the first zone to that of the second zone is within the range from 0.05:1 to 1:1.

7. A process as claimed in claim 1, wherein the extraction is carried out at from 100 to 140° C. in the first zone and at a from 5 to 40° C. lower temperature in the second zone.

8. A process as claimed in claim 1, wherein the extraction time is within the range from 5 to 20 hours.

9. A process as claimed in claim 1, wherein the extractant is added to the polyamide in a weight ratio within the range from 0.5:1 to 2:1.

10. A process as claimed in claim 1, wherein the extracted polyamide is discharged from the extractor using a single screw.

11. A process as claimed in claim 8, wherein the extraction time is within the range from 8 to 15 hours.

* * * * *